July 29, 1958
D. C. BOWMAN
APPARATUS FOR SIMULTANEOUS VISUAL REPRODUCTION OF A PLURALITY OF RECORDED TRANSIENTS
Filed Oct. 15, 1954
2,845,615
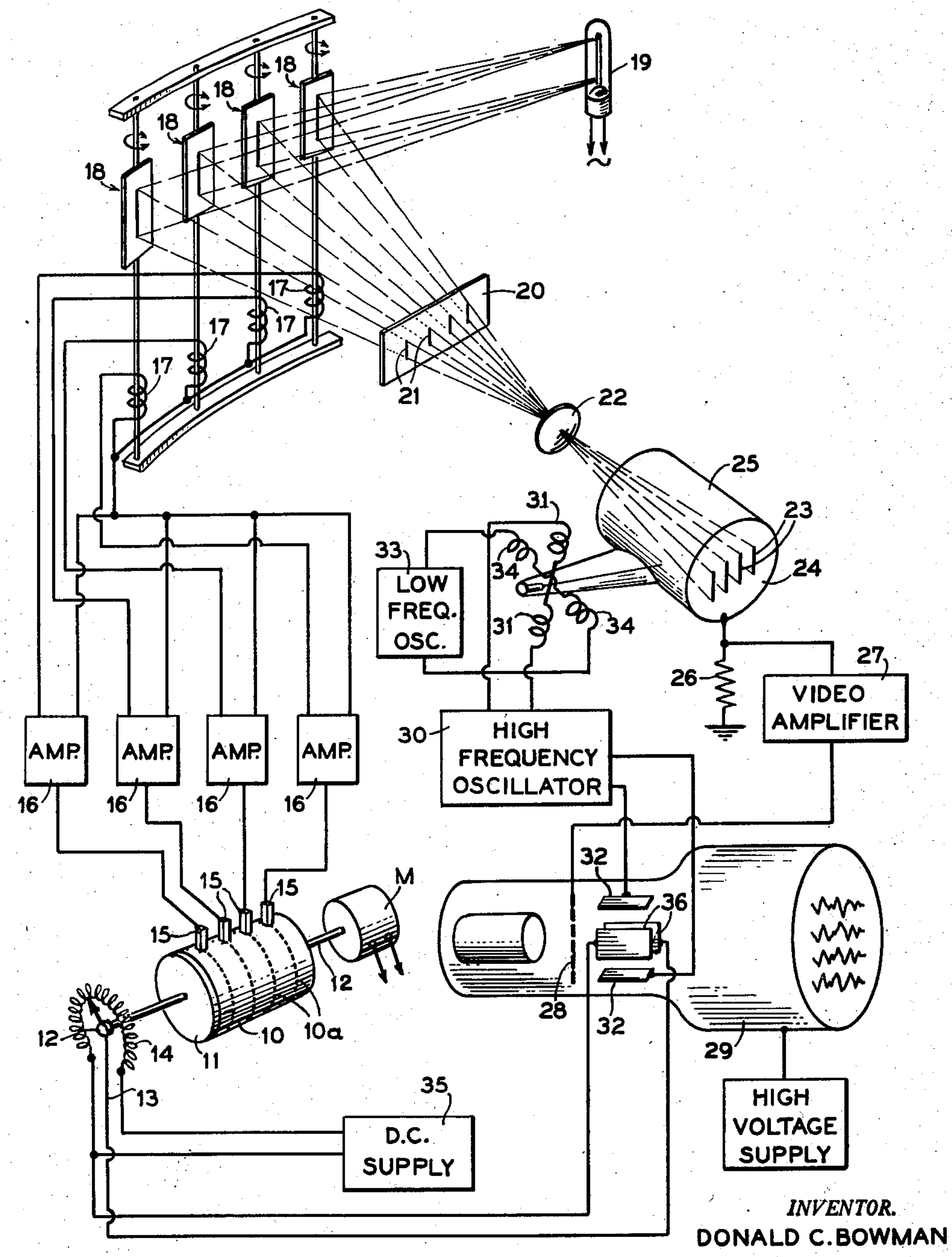
INVENTOR.
DONALD C. BOWMAN
BY
Adams, Forward & McLean
ATTORNEYS United States Patent Office 2,845,615

Patented July 29, 1958

2,845,615

APPARATUS FOR SIMULTANEOUS VISUAL REPRODUCTION OF A PLURALITY OF RECORDED TRANSIENTS

Donald C. Bowman, Tulsa, Okla., assignor to Sinclair Oil & Gas Company, Tulsa, Okla., a corporation of Maine Application October 15, 1954, Serial No. 462,468

2 Claims. (Cl. 340—324)

This invention relates to the simultaneous visual reproduction of a plurality of independent transients and, in particular, provides an apparatus for multi-trace reproduction on the face of a cathode ray tube.

In the analysis of seismic waves, such as are produced in prospecting subsurface geologic structure, it is often desirable to reproduce simultaneously as separate visual traces for comparative purposes the outputs of several geophones responsive to a single shot or different frequency spectra of the output of a single geophone.

This invention is based on the discovery that a plurality of electrically reproducible transients can be reproduced as separate visible traces on the face of a cathode ray tube if the transients are simultaneously reproduced cyclically employing separate transducers for each transient, feeding the electrical output of each transducer to a separate mirror galvanometer, the light source for which has substantial elongation such that when focused on a screen each mirror galvanometer image is a moving line. The moving line images from each mirror galvanometer are simultaneously focused on the picture mosaic of a conventional television camera tube as a series of parallel lines spaced from each other. The television camera tube is scanned in lines perpendicular to the image lines at a relatively high frequency comparable to the conventional horizontal scanning rate and the scanning lines are swept through a series of parallel positions at a relatively low frequency comparable to the conventional vertical sweep rate. The video output of the television camera tube, suitably amplified, is fed to the control grid of a cathode ray tube. The vertical sweep of the cathode ray tube is synchronized with the high speed horizontal sweep of the television camera tube suitably by employing a common oscillator. The horizontal sweep of the cathode ray tube is synchronized with the cyclic rate of reproduction of the transients. This results in the production of a separate horizontal trace on the face of the cathode ray tube for each transient reproduced, the series of traces being superposed and spaced from each other, each having a horizontal length which represents one cycle of play of the track with vertical displacement along such length in response to the variations of the transient.

Because of the cyclic reproduction of the transients, the traces are repeatedly reproduced providing a persistency of image that the entire trace is visible constantly. A high persistence cathode ray tube is used, therefore, to retain the image long enough to present a complete visual image for the cyclic period.

For a more complete understanding of the principles of this invention, reference is made to the accompanying drawing in which an arrangement of apparatus is diagrammatically represented.

In the drawing the reference numeral 10 represents a roll of magnetic film on the outer surface of which are recorded as separate tracks 10a the outputs of a plurality of geophones responsive to a single shot. Roll 10 is mounted on rotatable drum 11 mounted on shaft 12.

Shaft 12 is rotatably driven by motor M and carries a radial contact arm 13 which makes contact with potentiometer coil 14.

A series of magnetic pick-up heads 15 are mounted to pick up the magnetic recording of each track 10a on film 10. The output of each pick-up head 15 is fed to an electron tube amplifier 16. Each amplifier 16 is suitably a broad band amplifier having a pass band of from 10 to 500 cycles per second. The output of each amplifier 16 is in turn connected to the armature coil 17 of a mirror galvanometer 18.

Galvanometers 18 are disposed in a bank with their axes of rotation substantially parallel. A filamentary light source, such as a line filament lamp 19 disposed with its filament parallel to the axes of rotation of mirror galvanometers 18, is focused by conventional means (not shown) to produce reflected line images 21 on translucent screen 20, one such line image 21 being reflected from each galvanometer 18 such that the line images 21 fall on the screen 20 as a series of parallel lines spaced a sufficient distance from each other to prevent overlapping movement under the normally anticipated variations of the magnetic recorded tracks 10a on film 10.

The images 21 are focused by means of lens 22 to produce corresponding images 23 on the mosaic surface 24 of an iconoscope 25. Any other suitable television picture tube could, of course, be employed, such as an orthiconoscope, image orthicon or image dissector.

Video output from iconoscope 25 across resistor 26 is fed through a suitable video amplifier 27 of conventional construction. The output of video amplifier 27 is employed as a control voltage for control grid 28 of cathode ray tube 29. A common sweep oscillator and amplifier 30 is employed to generate the sweep voltages on horizontal deflection coils 31 of iconoscope 25 and vertical deflection plates 32 of cathode ray tube 29. Sweep oscillator 30 produces an output of suitable sawtooth shape having a fundamental frequency on the order of 15 kilocycles. The vertical sweep of iconoscope 25 is controlled by an independent vertical sweep oscillator and amplifier 33 of conventional construction which supplies sweep voltage to vertical deflection coils 34. The fundamental frequency of the output of sweep oscillator 33 is about 30 cycles per second and need not be synchronized with the sweep frequency of oscillator 30.

Horizontal deflecting voltages for cathode ray tube 29 are supplied to horizontal deflection plates 36 by means of D. C. power supply 35, the output of which is fed to deflection plates 36 through potentiometer 14 and contact arm 13. Thus the horizontal deflection frequency is equal to the rate of rotation of drum 11. In the case of seismic recordings, each film track 10a usually is six seconds in duration.

Referring to the preceding description of the apparatus employed, it will be observed that when drum 11 is rotated at a rate of six seconds per cycle to reproduce a four-track film, each of galvanometers 18 will cast a separate line image 21 on screen 20 vibrating with parallel displacement in response to the amplitude fluctuation in the reproduced output of the respective track 10a on film 10. The same vibrating lines are cast as images 23 on mosaic 24 of iconoscope 25 as a series of parallel vertical lines vibrating in horizontally displaced parallel positions. Each horizontal scan on mosaic 24 thus picks up each of the vibrating lines in its instantaneous position for the particular scanning cycle. Theoretically no vertical scanning of the picture mosaic 24 should be required but as a practical matter vertical deflection is necessary, and is provided for as shown, in order to leave each mosaic particle a sufficient time to recover its sensitivity between scanning. The video output thus connected to the control grid 28 of cathode ray tube 29 is synchronized with the vertical deflection voltage applied to plates 32 and in each vertical scan a dot image is formed on the face of cathode ray tube 29 for each line image picked up by a single horizontal scan in iconoscope 25. Because the horizontal scanning rate in cathode ray tube 29 is relatively slow compared with the rate of amplitude variations picked up on each track **10*a* on film 10, the vertical scanning dot images will form traces during a cycle on the face of cathode ray tube 29 which reproduces the amplitude variations picked up from the tracks 10*a* on roll 10**.

I claim:

1. An apparatus for visually reproducing simultaneously a plurality of independent electrically reproducible transients which comprises transducer means for cyclically reproducing said independent transients as a plurality of independent electrical outputs, galvanometer means connected to each said electrical output for producing a visible line image displaceable through parallel positions in response to variations of said electrical output, a televsion camera tube having a high frequency scanning beam sweep at right angles to a low frequency scanning beam sweep and a video output instantaneously responsive to the intensity of light on each scanned picture mosaic particle, means focusing the line images produced by said galvanometer means as a series of parallel line images on the picture mosaic of said camera tube disposed at right angles to said high frequency scanning beam sweep, a high persistence cathode ray tube having a high frequency scanning beam sweep at right angles to a low frequency scanning beam sweep and having a control element responsive to a video input to control the intensity of light produced by impingement of the scanning beam on the face of the cathode ray tube, the video output of said television camera tube being connected to the control element of said cathode ray tube, means synchronizing the high frequency scanning beam sweeps of said television camera tube and said cathode ray tube, and means synchronizing the low frequency scanning beam sweep of said cathode ray tube with the rate of cyclic reproduction of said transients by said transducer.

2. An apparatus according to claim 1 in which said galvanometer means comprises a bank of mirror galvanometers disposed with their axes of rotation parallel and means producing a line of light parallel to said axes of rotation disposed to reflect on said mirror galvanometers.

References Cited in the file of this patent

UNITED STATES PATENTS

| | | |
|---|---|---|
| 2,378,383 | Arndt | June 19, 1945 |
| 2,501,791 | Silverman | Mar. 28, 1950 |
| 2,570,858 | Rajchman | Oct. 9, 1951 |
| 2,582,793 | Perry | Jan. 15, 1952 |
| 2,628,689 | Rieber | Feb. 17, 1953 |
| 2,658,579 | Rieber | Nov. 10, 1953 |